United States Patent
Iyoki et al.

(10) Patent No.: US 8,024,816 B2
(45) Date of Patent: Sep. 20, 2011

(54) APPROACH METHOD FOR PROBE AND SAMPLE IN SCANNING PROBE MICROSCOPE

(75) Inventors: Masato Iyoki, Chiba (JP); Yoshiteru Shikakura, Chiba (JP); Masafumi Watanabe, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 108 days.

(21) Appl. No.: 12/700,236

(22) Filed: Feb. 4, 2010

(65) Prior Publication Data

US 2010/0205697 A1 Aug. 12, 2010

(30) Foreign Application Priority Data

Feb. 10, 2009 (JP) ................................. 2009-028747
Nov. 25, 2009 (JP) ................................. 2009-267578

(51) Int. Cl.
*G01Q 10/00* (2010.01)
*G02B 6/26* (2006.01)

(52) U.S. Cl. ............... 850/1; 860/2; 860/3; 250/307; 250/310; 324/520; 324/690

(58) Field of Classification Search .............. 850/1–3, 850/21, 22, 29, 33, 40, 52, 53, 61–63; 250/306, 250/307, 310; 73/104, 105; 324/520, 690
See application file for complete search history.

(56) References Cited

U.S. PATENT DOCUMENTS

| | | | | |
|---|---|---|---|---|
| 5,216,631 A | * | 6/1993 | Sliwa, Jr. ..................... | 365/174 |
| 5,289,004 A | * | 2/1994 | Okada et al. ..................... | 850/1 |
| 5,436,448 A | * | 7/1995 | Hosaka et al. ..................... | 850/1 |
| 5,854,487 A | * | 12/1998 | Braunstein et al. ............... | 850/9 |
| 6,189,374 B1 | * | 2/2001 | Adderton et al. ............... | 73/105 |
| 6,246,054 B1 | * | 6/2001 | Toda et al. ......................... | 850/1 |
| 6,310,342 B1 | * | 10/2001 | Braunstein et al. ............... | 850/2 |
| 6,437,343 B1 | * | 8/2002 | Okazaki et al. .......... | 250/442.11 |
| 6,589,812 B2 | * | 7/2003 | Dickey et al. .................. | 438/106 |
| 6,941,798 B2 | * | 9/2005 | Yamaoka et al. ............... | 73/105 |
| 7,605,368 B2 | * | 10/2009 | Shigeno et al. ............... | 250/306 |
| 7,716,970 B2 | * | 5/2010 | Watanabe et al. ............... | 73/105 |
| 2008/0223117 A1 | * | 9/2008 | Watanabe et al. ............... | 73/105 |
| 2008/0223122 A1 | * | 9/2008 | Watanabe et al. ............... | 73/105 |
| 2009/0158828 A1 | * | 6/2009 | Baba et al. ..................... | 73/105 |

FOREIGN PATENT DOCUMENTS

JP   2007-033321 A   2/2007

* cited by examiner

*Primary Examiner* — Bernard E Souw
(74) *Attorney, Agent, or Firm* — Brinks Hofer Gilson & Lione

(57) ABSTRACT

In detecting a displacement of a cantilever (2) by a displacement detecting mechanism (5) and allowing a probe (1) and a sample (8) to approach each other by at least one of a coarse-movement mechanism (13) and a vertical direction fine-movement mechanism (11) at the same time, an excitation mechanism (4) excites the cantilever (2) with a first excitation condition and the probe (1) and the sample (8) are allowed to approach each other with a first stop condition, and then the cantilever (2) is excited with a second excitation condition different from the first excitation condition, a second stop condition is set, and the probe (1) and the sample (8) are allowed to approach each other by the at least one of the vertical direction fine-movement mechanism (11) and the coarse-movement mechanism (13) until the second stop condition is satisfied.

7 Claims, 9 Drawing Sheets

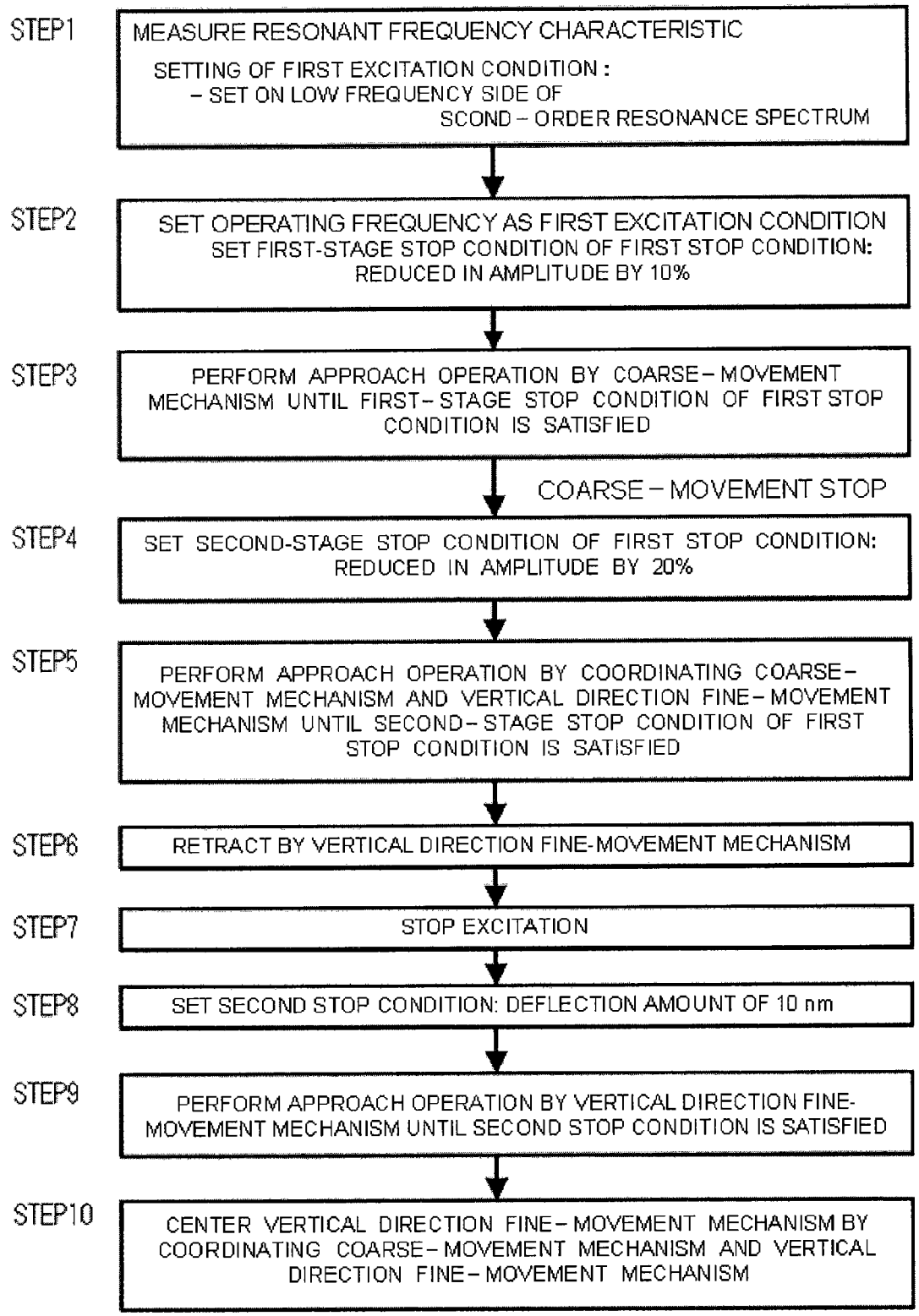

APPROACH METHOD FOR PROBE AND SAMPLE IN SCANNING PROBE MICROSCOPE

RELATED APPLICATIONS

This application claims priority under 35 U.S.C. §119 to Japanese Patent Application Nos. 2009-028747 filed on Feb. 10, 2009 and 2009-267578 filed on Nov. 25, 2009, the entire content of which is hereby incorporated by reference.

BACKGROUND OF THE INVENTION

1. Technical Field

The present invention relates to an approach method for a probe and a sample in a scanning probe microscope for relatively scanning the probe and the sample to measure a shape and a physical property of a surface of the sample, process the surface of the sample, or move a substance on the surface of the sample by the probe while controlling a distance by detecting an interaction between a cantilever including the probe at its distal end and the surface of the sample in the atmosphere, a vacuum, or a solution.

2. Description of the Related Art

Referring to FIGS. 5 and 6, a configuration of a conventional scanning probe microscope is described (see JP 2007-33321 A).

FIG. 5 is a configuration diagram of the conventional scanning probe microscope. In the conventional scanning probe microscope, a sample 101 is placed on a distal end of a three-axis fine-movement mechanism 102 including a cylindrical piezoelectric element, the three-axis fine-movement mechanism being fixed on a coarse-movement mechanism 103 used for allowing the sample 101 and a probe 106b provided at a distal end of a cantilever 106a to be described below to approach each other. On the other hand, the cantilever 106a including the probe 106b at its distal end is placed immediately above the sample 101, the cantilever 106a including a piezoelectric element 105 for exciting the cantilever at its proximal portion. A displacement of the cantilever 106a is detected by a displacement detecting mechanism including a laser diode (LD) 104 and a photodetector (PD) 107. The displacement detecting mechanism generally employs a method called optical lever method to reflect a laser beam from the LD 104 on a back surface of the cantilever 106a and cause the reflected beam to enter a detection surface of the PD 107. When the cantilever is deflected, a laser spot on the detection surface of the PD 107 moves. The displacement of the cantilever 106a may be detected by the spot position on the detection surface at this time.

A case where an apparatus having the above-mentioned configuration is used for measurement by an oscillating mode atomic force microscope, which is one type of the scanning probe microscope, is described. An amplitude and a phase of the cantilever are measured by the displacement detecting mechanism while exciting the cantilever 106a in the vicinity of a first-order resonant frequency by the piezoelectric element 105, the sample 101 is allowed to approach the probe 106b by the coarse-movement mechanism 103, and thereafter the probe 106b and the sample 101 are allowed to further approach each other by the three-axis fine-movement mechanism 102. Then, a physical force such as an atomic force acts between the sample and the probe 106b. When the sample and the probe 106b further approach each other, the sample and the probe 106b intermittently contact each other in accordance with the oscillation of the cantilever 106a and a contact force acts between the sample and the probe 106b. The atomic force and the contact force change the amplitude and the phase or the resonant frequency of the cantilever 106a. The amount of change depends on the distance between the probe 106b and the sample 101. Therefore, in order to ensure that the amount of change in amplitude and phase or resonant frequency of the cantilever 106a is always constant, the distance between the probe 106b and the sample 101 is controlled by the three-axis fine-movement mechanism 102 to control the distance in a height direction. Further, a topographic image of a sample surface may be measured by scanning the probe 106b within a plane of the sample 101 by the three-axis fine-movement mechanism 102.

In addition to the oscillating mode atomic force microscope, there is also known a method called contact mode. In this method, the probe and the sample are brought closer to each other by the coarse-movement mechanism while detecting the displacement by the displacement detecting mechanism without exciting the cantilever, and thereafter the distance in the height direction is controlled by the three-axis fine-movement mechanism. At this time, the physical force such as the atomic force acts on a tip of the probe, and the probe experiences an attractive force at first and experiences a repulsive force when the probe and the sample further approach each other. The attractive force and the repulsive force deflect the cantilever. The physical force such as the atomic force depends on the distance between the probe and the sample. Therefore, the probe and the sample are allowed to approach each other within an area in which the atomic force acts on the probe, the probe is scanned within a two-dimensional plane by the three-axis fine-movement mechanism, and the distance between the probe and the sample is controlled so that the amount of deflection of the cantilever becomes constant, to thereby form the topographic image of the sample surface.

In the case of the oscillating mode atomic force microscope, there is also known a method of performing a measurement while exciting the cantilever in the vicinity of a second- or higher-order resonant frequency, in addition to the method of exciting the cantilever in the vicinity of the first-order resonant frequency as described above. In this case, in addition to the oscillating mode in which the tip of the probe oscillates perpendicularly to a long axis direction of the cantilever and in a vertical direction with respect to the sample surface, the cantilever is oscillated in various oscillating modes. A representative oscillating mode includes an oscillating mode in which the probe oscillates torsionally around the long axis of the cantilever.

Further, as an application of the oscillating mode or contact mode atomic force microscope, a physical property such as electrical, magnetical, or optical property, or a mechanical property of the sample is also measured by detecting the physical action at the tip of the probe and the sample surface.

The oscillating mode atomic force microscope using the first-order resonant mode has a merit of causing less damage on the probe and the sample compared to the contact mode atomic force microscope. Further, a signal of the physical property is also detected in synchronization with the oscillation of the cantilever.

On the other hand, the contact mode atomic force microscope has merits of simpler configuration and higher scanning speed compared to the oscillating mode atomic force microscope. Further, the contact mode atomic force microscope may ensure that the cantilever is brought into contact with the sample, and hence is also used for measuring the electrical property of the sample surface.

Further, higher-order oscillating modes are applied to measurements that take advantage of features of the respective oscillating modes. For example, the oscillating mode of the torsional oscillation around the long axis has a feature that the distance between the sample and the probe may be maintained substantially constant during the measurement.

Many measurements by the scanning probe microscope are performed in the atmosphere. However, the cantilever and the sample are placed in a vacuum for measurement when it is desired to eliminate the effect of adsorbed water on the sample surface, vary the temperature of the sample surface, or avoid alteration of the sample surface.

Further, when an organic sample such as a polymer, a cell, a chromosome, a deoxyribonucleic acid (DNA), a protein, or the like, or a biological sample is used, there are cases where the sample and the cantilever are immersed in a solution such as a culture for measurement because the sample is altered when exposed to the atmosphere. The measurement in the solution is applied to in situ observation of a biological sample, an organic polymer sample, and the like, a measurement combined with an electrochemical reaction in the solution, or the like.

Next, referring to FIGS. 5 and 6, a method of controlling the distance between the probe and the sample is described for the oscillating mode atomic force microscope. A current signal generated in the PD 107 in accordance with the oscillation displacement of the cantilever 106a is amplified and converted to a voltage signal by a preamplifier 108. An output from the preamplifier 108, which is an alternate current (AC) signal, is sent to a root mean squared value to direct current (RMS-DC) converter 109 to be converted to a direct current (DC) signal, which corresponds to a root mean squared value.

FIG. 6 is a graph illustrating a relationship between an amplitude amount of the cantilever 106a and the distance between the probe 106b and the sample 101 as the probe 106b and the sample 101 are brought closer to each other from a distance. In FIG. 6, the abscissa represents time in which the probe 106b and the sample 101 are brought closer to each other by the coarse-movement mechanism 103, and the time is converted to the distance between the probe 106b and the sample 101 by being multiplied by a speed of the coarse-movement mechanism 103. The ordinate represents the voltage signal converted by the RMS-DC converter 109, and the voltage signal is converted to the amplitude amount of the cantilever 106a. The change of the signal on the ordinate to the positive side indicates a direction in which the amplitude of the cantilever 106a is reduced. In the scanning probe microscope, a reference signal for measurement is set using the amount of change in amplitude as a parameter in advance in a reference value generating section 111. In the case of bringing the probe 106b and the sample 101 closer to each other, the conventional practice is to bring the probe 106b and the sample 101 closer to each other to a certain extent through manual adjustment by the coarse-movement mechanism 103 while observing by an optical microscope or the like, and thereafter, to further bring the probe 106b and the sample 101 closer to each other by the coarse-movement mechanism 103 until the RMS-DC converted signal reaches the reference signal set in the reference value generating section 111. Note that in bringing the probe 106b and the sample 101 closer to each other, not only the coarse-movement mechanism 103 but also a vertical direction fine-movement mechanism of the three-axis fine-movement mechanism 102 may be used in combination.

As an alternative to the case where the RMS-DC converted voltage is used as the reference signal, there is also a case where a phase difference signal between the voltage applied to the piezoelectric element 105 for exciting the cantilever and the signal detected by the PD 107 may be set as the reference signal in a frequency modulation (FM) demodulator 115.

Further, there is also a mode in which, after a first step of bringing the probe 106b and the sample 101 closer to each other using the phase difference signal as the reference signal, the probe 106b and the sample 101 are retracted once by the vertical direction fine-movement mechanism of the three-axis fine-movement mechanism 102, and the probe 106b and the sample 101 are brought closer to each other up to a measurement area under the same excitation condition by coordinating the vertical direction fine-movement mechanism of the three-axis fine-movement mechanism 102 and the coarse-movement mechanism 103 using the RMS-DC converted voltage signal based on the displacement signal as the reference signal. The phase difference signal starts changing earlier than the RMS-DC converted signal from when the distance between the probe 106b and the sample 101 is still large. Therefore, this mode allows the probe 106b and the sample 101 to approach each other up to the measurement area by bringing the probe 106b and the sample 101 closer to each other at high speed and stopping the probe 106b and the sample 101 reliably at a position at which the probe 106b and the sample 101 do not collide with each other in the first step, and then switching the reference signal to the RMS-DC converted signal.

After bringing the probe 106b and the sample 101 close to each other up to the measurement area, the distance between the probe 106b and the sample 101 is controlled to be constant by feeding back the distance between the probe 106b and the sample 101 so that the amplitude amount of the cantilever 106a is adjusted to the reference signal set in the reference value generating section 111. Specifically, the signal from the RMS-DC converter 109 and the reference signal of the reference value generating section 111 are compared in an error amplifier 110, a signal corresponding to an error is generated in a feedback circuit 112, and a voltage for the height corresponding to the error is applied to the vertical direction fine-movement mechanism of the three-axis fine-movement mechanism 102 through a high voltage amplifier 117. The output from the feedback circuit 112, which is an analog signal, is also converted to a digital signal by an analog/digital (A/D) converter 113, sent to a personal computer for control 114, and imaged as height information. Further, a raster scan signal generated in a scan generator 118 and amplified in the high voltage amplifier 119 is applied to a horizontal direction fine-movement mechanism of the three-axis fine-movement mechanism 102. The raster scan signal and the height information are imaged in the personal computer 114, with the result that the topographic image of the sample 101 may be obtained.

In the scanning probe microscope configured as above, the approach technology for the probe and the sample is very important. Specifically, if the probe and the sample collide with each other when the probe and the sample approach each other, the tip of the probe and the sample surface are broken, to thereby lead to reduced resolution in measuring the topographic image and the damage to the sample. Alternatively, when the speed of the coarse-movement mechanism is lowered to allow the probe and the sample to approach each other more carefully, it takes a long time for the probe and the sample to approach each other, to thereby reduce the measurement efficiency.

Further, in the case of allowing the probe and the sample to approach each other, when the probe and the sample are brought close to each other up to about several tens of μm, the amplitude of the cantilever is gradually reduced by viscous damping due to air that exists in a region between the sample surface and the cantilever. On the other hand, especially when the measurement is performed in the vacuum, the damping due to the air hardly occurs until near the measurement area, and the amplitude hardly changes until the sample and the probe are brought close to each other up to several tens of nm. Therefore, it is difficult to stop the coarse-movement mechanism before causing the collision, and it is more challenging to allow the probe and the sample to approach each other without causing the collision.

In order to reduce the damage to the probe and the sample during the approach as well as to reduce the time it takes for the approach, it is desired to allow the probe and the sample to approach each other at high speed by the coarse-movement mechanism in an area where the probe and the sample do not collide with each other until near the collision, thereafter allow further approach through coordinated operation of the coarse-movement mechanism and the vertical direction fine-movement mechanism, and finally stop the coarse-movement mechanism and operate only the vertical direction fine-movement mechanism when the probe and the sample are brought into contact with each other.

In the conventional method, when the coarse-movement mechanism is operated at high speed, the coarse-movement mechanism may be stopped so late that the probe and the sample may collide with each other. Therefore, in order to reduce the impact in case of the collision or to ensure enough processing time for comparing the RMS-DC converted signal and the reference signal and stopping the coarse-movement mechanism, it has been necessary to lower the speed of the coarse-movement mechanism. As a result, the approach has taken a long time.

In the method including the first step of allowing the probe and the sample to approach each other using the phase difference signal as the reference signal, and a second step of allowing the probe and the sample to further approach each other using the RMS-DC converted signal as the reference signal, the probe and the sample may be allowed to approach each other at high speed without colliding with each other in the first step. However, a special electric circuit such as the FM demodulator is required to perform the measurement using the phase difference signal as the reference signal, and processing for the approach becomes complicated.

Also, it has been impossible to change the excitation condition for the second step because the excitation condition has been the same for the first step and the second step. Especially in the higher-order oscillating modes, it has often been the case that the amplitude or the phase of the cantilever hardly changes until the probe and the sample are brought close to each other up to near the measurement area, which often leads to the collision between the probe and the sample.

Further, in the case of measuring in the contact mode, the probe and the sample often collide with each other to generate a larger impact than in the oscillating mode upon the collision, and hence there has been no choice but to lower the speed of the coarse-movement mechanism.

SUMMARY OF THE INVENTION

The present invention has been made in view of the above, and an object of the present invention is therefore to provide an approach method for a probe and a sample in an oscillating mode scanning probe microscope, which oscillates a cantilever in the vicinity of a first- or higher-order resonant frequency, and in a contact mode scanning probe microscope, the method being capable of preventing the probe from contacting the sample to be damaged and thereby breaking a tip of the probe and the sample during an approach operation, of further operating the probe and the sample at high speed by a coarse-movement mechanism and stopping the coarse-movement mechanism reliably in time before the probe and the sample are brought into contact with each other, and of allowing the probe and the sample to further approach each other up to a measurement area in a short time even after stopping the coarse-movement mechanism while preventing the tip of the probe and the sample from being broken.

In order to solve the above-mentioned problems, the present invention provides the following means.

According to the present invention, there is provided an approach method for a probe and a sample in a scanning probe microscope, the scanning probe microscope including: a cantilever including the probe at a distal end thereof; an excitation mechanism for exciting the cantilever; a displacement detecting mechanism for detecting a displacement of the cantilever; a vertical direction fine-movement mechanism for adjusting a distance between the probe and the sample placed at a position opposing the probe; and a coarse-movement mechanism for allowing the probe and the sample to approach each other, the approach method including, in detecting the displacement of the cantilever by the displacement detecting mechanism and allowing the probe and the sample to approach each other by at least one of the coarse-movement mechanism and the vertical direction fine-movement mechanism at the same time: exciting the cantilever by the excitation mechanism with a first excitation condition and allowing the probe and the sample to approach each other with a first stop condition; and exciting, after an approach operation with the first stop condition, the cantilever with a second excitation condition that is different from the first excitation condition, setting a second stop condition, and allowing the probe and the sample to approach each other by the at least one of the vertical direction fine-movement mechanism and the coarse-movement mechanism until the second stop condition is satisfied.

Further, in the approach method according to the present invention, the first excitation condition for the cantilever is excitation at a frequency on a high frequency side of a first-order resonant frequency in a first-order resonance spectrum of the cantilever, and any one of an amplitude, a phase difference, and a resonant frequency of the cantilever detected by the displacement detecting mechanism is set as the first stop condition.

By thus allowing the probe and the sample to approach each other, the coarse-movement mechanism may be stopped reliably before the probe and the sample collide with each other because the signal change may be detected at a position where the distance between the probe and the sample is larger in a case where the excitation is performed at a frequency on the high frequency side of the resonant frequency in the first-order resonance spectrum, than in a case where the excitation is performed at a frequency on the low frequency side. Further, in the approach method according to the present invention, the second excitation condition for the cantilever is excitation at a frequency on the low frequency side of the first-order resonant frequency in the first-order resonance spectrum of the cantilever, and any one of the amplitude, the phase difference, and the resonant frequency of the cantilever detected by the displacement detecting mechanism is set as the second stop condition.

The measurement may be performed with higher sensitivity in the case where the excitation is performed at the frequency on the low frequency side of the resonant frequency in the first-order resonance spectrum, than in the case where the excitation is performed at the frequency on the high frequency side. By thus allowing the probe and the sample to approach each other, the coarse-movement mechanism may be stopped reliably before the probe and the sample collide with each other, and the speed of the approach operation may be increased, compared to the case of allowing the approach by performing the excitation at the frequency on the low frequency side from the start.

Further, in the approach method for a probe and a sample in a scanning probe microscope according to the present invention, the second excitation condition is excitation at a frequency on a second- or higher-order resonance spectrum of the cantilever. With this configuration, the probe and the sample may be prevented from colliding with each other during the approach operation even when the oscillation is performed at the higher-order resonance spectrum during the measurement.

Further, according to the present invention, there is provided an approach method for a probe and a sample in a scanning probe microscope, the scanning probe microscope including: a cantilever including the probe at a distal end thereof; an excitation mechanism for exciting the cantilever; a displacement detecting mechanism for detecting a displacement of the cantilever; a vertical direction fine-movement mechanism for adjusting a distance between the probe and the sample placed at a position opposing the probe; and a coarse-movement mechanism for allowing the probe and the sample to approach each other, the approach method including, in detecting the displacement of the cantilever by the displacement detecting mechanism and allowing the probe and the sample to approach each other by at least one of the coarse-movement mechanism and the vertical direction fine-movement mechanism at the same time: exciting the cantilever by the excitation mechanism with a first excitation condition and allowing the probe and the sample to approach each other with a first stop condition; and stopping, after an approach operation with the first stop condition, exciting the cantilever, setting a deflection amount of the cantilever detected by the displacement detecting mechanism as a second stop condition, and allowing the probe and the sample to approach each other by the at least one of the vertical direction fine-movement mechanism and the coarse-movement mechanism until the second stop condition is satisfied. By allowing the probe and the sample to approach each other by the method as described above, the probe and the sample may be allowed to approach each other at high speed without colliding with each other even when the measurement is performed in the contact mode, because the approach in the oscillating mode is performed in the first step.

Further, according the present invention, the scanning probe microscope further includes: at least one excitation condition setting means; a first stop condition setting means; and a second stop condition setting means, and the approach method further includes, in performing approach operations from a start of the approach operation for the probe and the sample to satisfaction of the second stop condition, setting at least one condition set by each of the at least one excitation condition setting means, the first stop condition setting means, and the second stop condition setting means at once or separately in a plurality of times to allow the probe and the sample to automatically approach each other.

By providing such a function, the probe and the sample may be allowed to approach each other easily without making complicated settings, to thereby improve operability.

According to the present invention, by allowing the probe to approach the sample by the method as described above in the oscillating mode scanning probe microscope, which oscillates the cantilever on the first- or higher-order resonance spectrum, or the contact mode scanning probe microscope, the probe may be prevented from contacting the sample to be damaged and thereby breaking the tip of the probe and the sample during the approach operation, and further, the probe and the sample may be operated at high speed by the coarse-movement mechanism and the coarse-movement mechanism may be stopped reliably in time before the probe and the sample are brought into contact with each other. Further, even after the coarse-movement mechanism is stopped, the probe and the sample may be allowed to approach each other up to the measurement area in a short time while preventing the tip of the probe and the sample from being broken.

As a result, the scanning probe microscope may perform a measurement with high resolution because the measurement is performed without damaging the probe and the sample, to thereby speed up the approach operation, reduce the time required for the measurement, and improve the operability.

BRIEF DESCRIPTION OF THE DRAWINGS

In the accompanying drawings:

FIG. 10 is a flow chart of an approach method for a probe and a sample according to a fifth embodiment of the present invention.

DETAILED DESCRIPTION OF THE PREFERRED EMBODIMENTS

Hereinafter, modes for carrying out the present invention are described in detail with reference to the drawings.

First Embodiment

Figure 1:
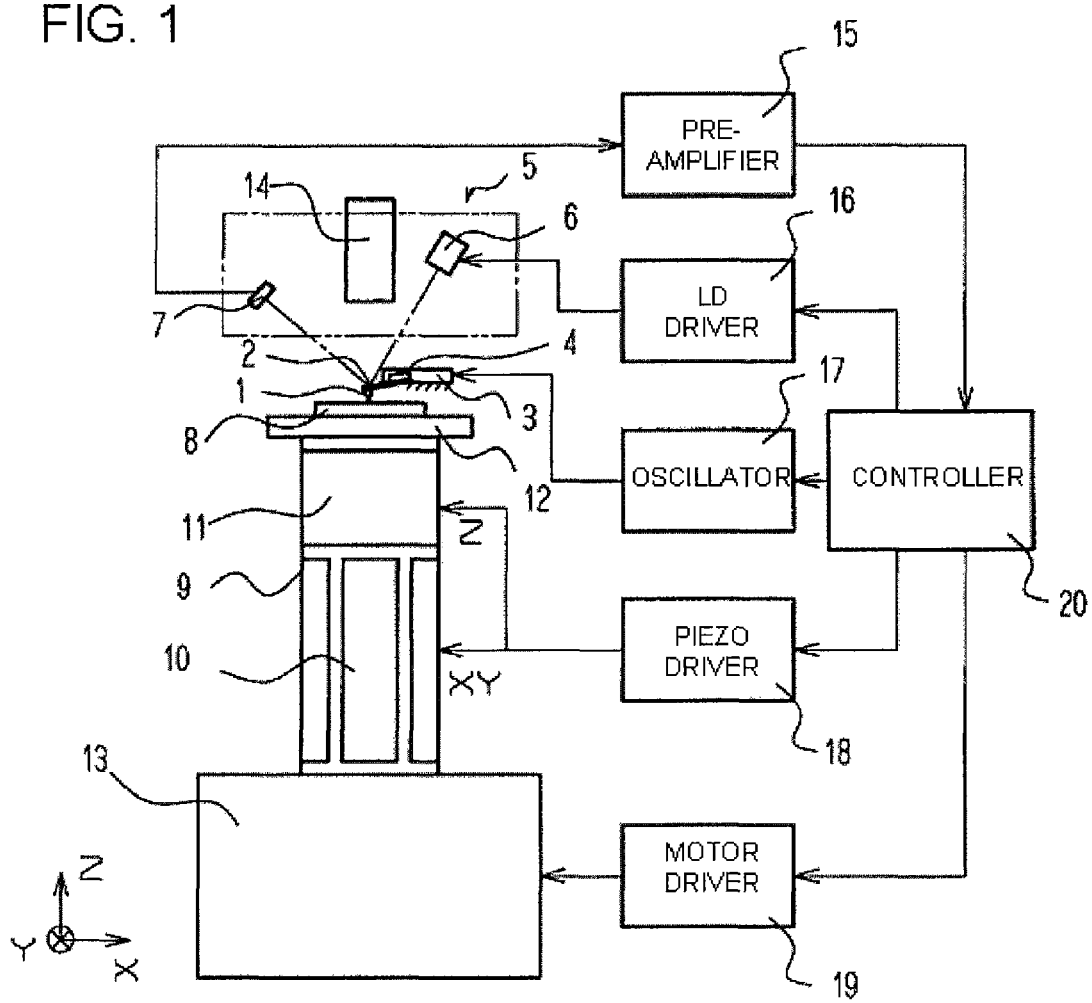
FIG. 1 is a schematic diagram illustrating a scanning probe microscope used in the present invention.

FIG. 1 is a schematic diagram illustrating a scanning probe microscope according to a first embodiment of the present invention. In this embodiment, a cantilever 2 which is made of silicon and has a probe 1 at its distal end is fixed to a cantilever holder 3. A vibrator 4 formed of a piezoelectric element for exciting the cantilever 2 is attached to the cantilever holder 3. When the scanning probe microscope is used as an oscillating mode scanning probe microscope, an alternate current (AC)

voltage is applied to the piezoelectric element constituting the vibrator 4 to oscillate the vibrator 4 and hence oscillate the cantilever 2.

A displacement detecting mechanism 5 for detecting a displacement of the cantilever 2 includes a semiconductor laser 6 and a two-cell photodetector 7 to detect the deflection of the cantilever 2 in a mode generally called optical lever method. First, a beam from the semiconductor laser 6 is condensed and a back surface of the cantilever 2 is irradiated with the condensed beam. The beam reflected on the back surface of the cantilever 2 enters a detection surface of the photodetector 7. When the cantilever 2 is deflected, a spot moves vertically within a plane of the photodetector 7. At this time, a difference in signal strength on the divided detection surface is detected to detect the deflection. Note that a quadrant photodetector may be used in a case where a torsion angle of the cantilever 2 is detected or a measurement by torsional oscillation is performed in the oscillating mode to be described below when a measurement of a friction force between the probe 1 and a sample 8 or the like is performed. The signal detected with the photo detectors 7 passes a preamplifier 15 and a controller 20 sequentially, and it is feed back for a LD driver 16 for the semiconductor laser 6, an oscillator 17 for the vibrator 4, a piezodriver 18 and a motor driver 19 to control the three axis fine-movement mechanism 9 and the coarse-movement mechanism 13.

The sample 8 is placed on a sample holder 12 that is provided on a distal end of a three-axis fine-movement mechanism 9 formed of a cylindrical piezoelectric element. At this time, the sample holder 12 is installed so as to be opposed to the probe 1.

The three-axis fine-movement mechanism 9 includes a horizontal direction fine-movement mechanism (XY fine-movement mechanism) 10 for scanning the sample 8 placed on the sample holder 12 in a direction within a sample plane (XY plane), and a vertical direction fine-movement mechanism (Z fine-movement mechanism) 11 for finely moving in a direction perpendicular to the sample plane (Z direction).

A proximal end of the three-axis fine-movement mechanism 9 is attached to a coarse-movement mechanism 13. The coarse-movement mechanism 13 includes a stepping motor and a feed screw, and is capable of moving the sample 8 in a direction of the probe 1 (Z direction).

Further, an optical microscope 14 for observing the cantilever 2 and a surface of the sample 8 is provided above the cantilever 2. The optical microscope 14 is used for the purposes of positioning the laser spot of the displacement detecting mechanism 5 on the back surface of the cantilever 2, allowing the probe 1 and the sample 8 to roughly approach each other, positioning the probe 1 at a measurement point of the sample 8, and the like.

Next, a measuring method according to this embodiment is described. In this embodiment, a measurement is performed while oscillating the cantilever with an excitation frequency set on a first-order resonance spectrum of the cantilever. The first-order resonant mode is a mode in which the cantilever 2 performs a bending operation within a plane that is perpendicular to a long axis of the cantilever 2 and perpendicular to the sample surface to oscillate the probe 1 vertically.

The resonance spectrum as used herein refers to a plurality of mountain-shaped waveforms, each of which is measured for each order of resonant frequency and has a peak at the resonant frequency, obtained by measuring oscillating characteristics of the cantilever when the abscissa is frequency and the ordinate is amplitude (or speed or acceleration) of the cantilever. Excitation at the resonance spectrum as used herein means excitation at any frequency between the peak and the baseline of each mountain-shaped waveform. Those definitions shall apply throughout this specification.

When a measurement is performed in this embodiment, first, the sample 8 and the cantilever 2 are set, the displacement detecting mechanism 5 is adjusted, and then the coarse-movement mechanism 13 is operated at high speed while observing the probe 1 and the sample 8 by visual inspection and the optical microscope 14 to roughly bring the sample 8 closer to the probe 1. Note that the approach operation through observation by the visual inspection and the optical microscope 14 may be omitted.

Figure 2:
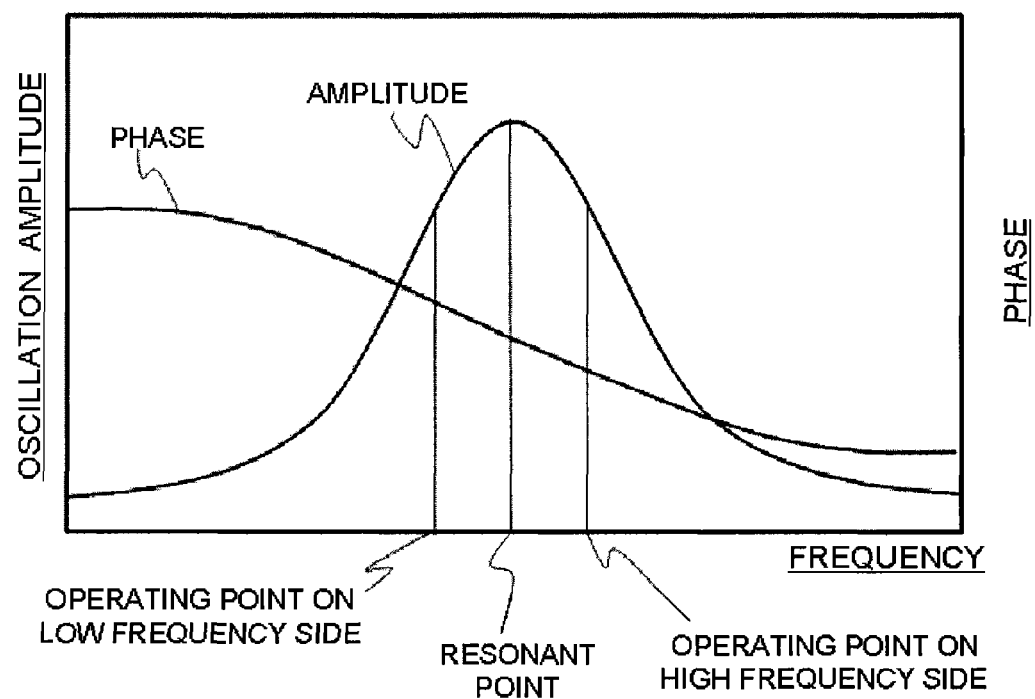
FIG. 2 illustrates a first-order resonance spectrum and a phase difference signal, which are measured when a frequency characteristic of a cantilever is measured.

Next, resonant frequency characteristics of the cantilever are measured. FIG. 2 illustrates a waveform of a measured first-order resonance peak, where the abscissa of FIG. 2 is excitation frequency at which the cantilever 2 is excited, and the ordinate is amplitude amount of the cantilever. Note that FIG. 2 also illustrates a phase difference between an excitation signal applied to the vibrator 4 and an amplitude signal of the cantilever 2 detected by the displacement detecting mechanism.

Next, a first excitation condition is set to an arbitrary frequency on the first-order resonance spectrum measured in FIG. 2. In this embodiment, the excitation frequency is set between the peak and the baseline on the high frequency side of the first-order resonant frequency, which corresponds to the peak of the resonance spectrum of the amplitude of FIG. 2. The excitation frequency is preferably a frequency at an amplitude position of about $1/\sqrt{2}$ of the height from the baseline to the peak. Further, the voltage of the AC signal applied to the vibrator 4 by the oscillator 17 is adjusted to set the amplitude amount.

Next, a first stop condition is set. In this embodiment, an amount of change in amplitude of the cantilever 2 is set to set a stop signal for the approach operation and a reference signal for controlling a distance between the probe 1 and the sample 8 during the measurement. In this embodiment, the first stop condition includes two stages. Specifically, a position at which the amplitude decreases by about 5% from the amplitude set in the first excitation condition is defined as a first-stage stop condition of the coarse-movement mechanism 13, and a position at which the amplitude further decreases by about 10% from the first excitation condition is defined as a second-stage stop condition in which the coarse-movement mechanism 13 and the vertical direction fine-movement mechanism 11 are operated coordinately to end a first approach operation.

Figure 3:
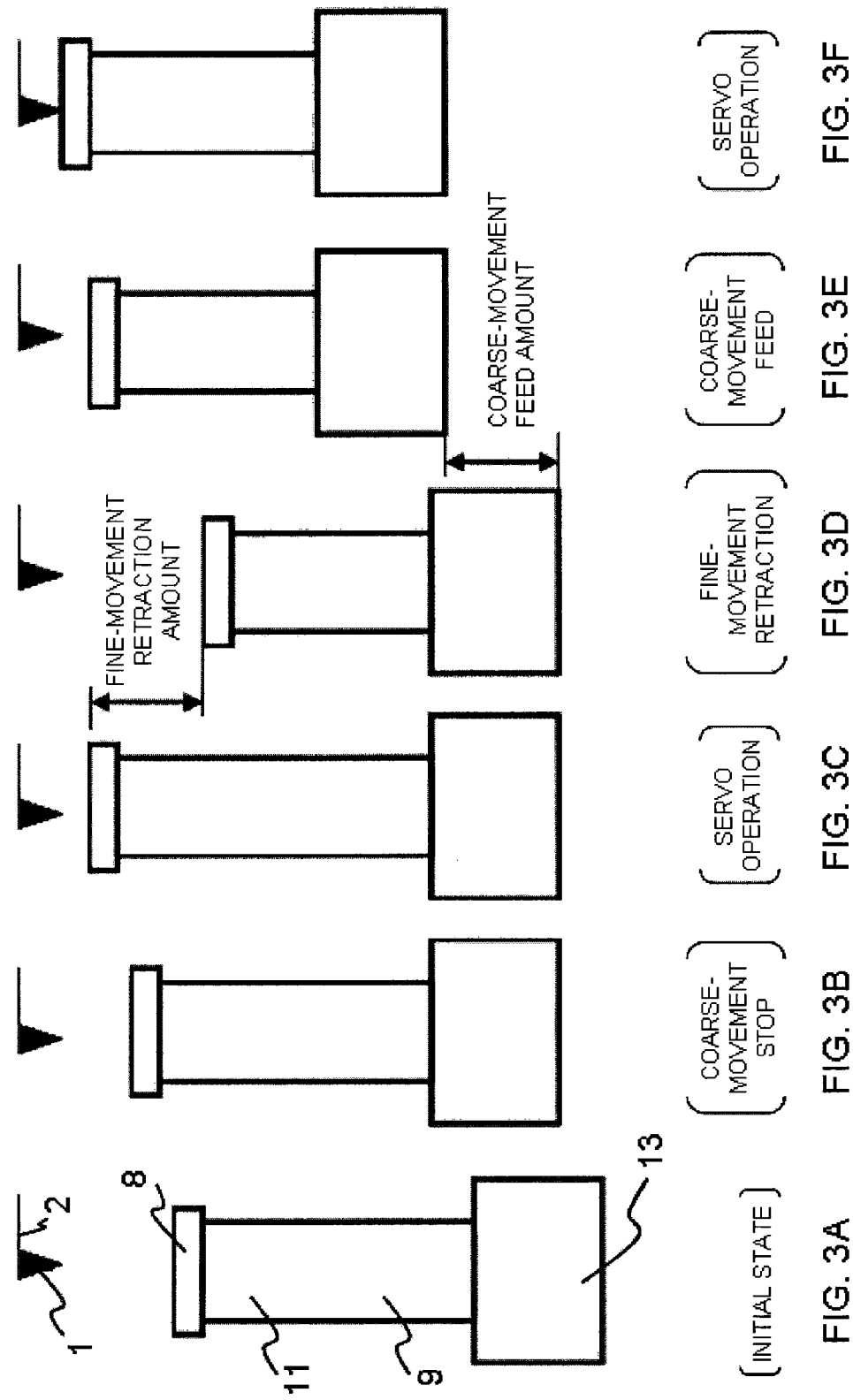
FIG. 3 is a principle diagram of an approach operation between a probe and a sample.

An approach method after the first excitation condition and the first stop condition are set as described above is described referring to a principle diagram of FIG. 3. First, as illustrated in part (a) of FIG. 3, the vertical direction fine-movement mechanism 11 is locked at a middle position of the maximum travel limit, and the sample 8 is allowed to approach the probe 1 by the coarse-movement mechanism 13. The vertical direction fine-movement mechanism 13 is locked in the direction of bringing the probe 1 and the sample 8 closer to each other so as not to perform a servo operation, and is adapted to perform the servo operation in the direction of separating the probe 1 and the sample 8 from each other in accordance with the amount of change in amplitude of the cantilever 2 so as to absorb an impact force by retracting the probe 1 and the sample 8 even if the probe 1 and the sample 8 are brought into contact with each other.

When the probe 1 and the sample 8 are brought close to each other, the amplitude of the cantilever 2 starts to change by the viscous resistance due to air applied on the cantilever 2, a squeeze force due to air existing in a small space between the sample 8 and the cantilever 2, or an atomic force or electrostatic force acting between the probe 1 and the sample 8. When the amount of change is decreased by 5%, which is set as the first-stage stop condition of the first stop condition, the coarse-movement mechanism 13 is stopped. At this time, the value for the first stage of the first stop condition is preferably set so that the probe 1 and the cantilever 2 are stopped in time before being brought into contact with each other and the distance between the probe 1 and the cantilever 2 is reduced as much as possible. In this embodiment, as illustrated in part (b) of FIG. 3, the probe 1 and the sample 8 are stopped at positions about several tens of μm away from each other.

Next, the first stop condition is set to the second-stage stop condition, the servo operation of the vertical direction fine-movement mechanism 11 is unlocked also in the direction of bringing the probe and the sample closer to each other so as to enable the servo operation in both directions. With the probe 1 and the sample 8 being separated from each other, the vertical direction fine-movement mechanism 11 operates in the direction of bringing the sample 8 closer to the probe 1. At this time, the approach operation with the first stop condition ends when the amplitude amount of the cantilever 2 reaches the value set for the second stage of the first stop condition before the vertical direction fine-movement mechanism 11 reaches its maximum stroke.

If the vertical direction fine-movement mechanism 11 is extended to the maximum stroke before the amplitude amount of the cantilever 2 reaches the value set for the second stage of the first stop condition as illustrated in FIG. 3(*c*), the vertical direction fine-movement mechanism 11 and the coarse-movement mechanism 13 is coordinated to allow the probe 1 and the sample 8 to approach each other.

The operation at this time is started from a state where the vertical direction fine-movement mechanism 11 is pulled back by a predetermined length from the maximum stroke as illustrated in part (d) of FIG. 3. The pull-back amount may be set as appropriate, but the approach operation may be performed faster when the vertical direction fine-movement mechanism 11 is pulled back as much as possible. In this embodiment, the operation is started from a state where the vertical direction fine-movement mechanism 11 is pulled back to the maximum.

Next, the servo operation of the vertical direction fine-movement mechanism is locked in the direction of bringing the probe and the sample closer to each other, and the probe 1 and the sample 8 are brought closer to each other by the coarse-movement mechanism 13 by the pull-back amount of the vertical direction fine-movement mechanism 11 as illustrated in part (e) of FIG. 3. After that, the servo operation of the vertical direction fine-movement mechanism 11 is enabled in the both directions. The operations of part (c) to part (e) of FIG. 3 are repeated to bring the probe 1 and the sample 8 closer to each other until the amount of change in amplitude of the cantilever reaches the second-stage stop condition of the first stop condition. Eventually, the probe 1 and the sample 8 are brought close to each other up to a measurable area as illustrated in part (f) of FIG. 3. At this time, the probe 1 and the sample 8 intermittently contact each other. At the moment when the probe 1 and the sample 8 contact each other, only the vertical direction fine-movement mechanism 13 is operated so that the probe 1 and the sample 8 may contact each other with less impact than in the case of contact during the operation of the coarse-movement mechanism 13. This completes the approach operation with the first excitation condition.

Next, the approach operation with a second excitation condition is described. First, the probe 1 and the sample 8 are retracted by the vertical direction fine-movement mechanism 11 from the state at the end of the approach operation with the first excitation condition. The retraction amount may be set as appropriate, but the probe 1 and the sample 8 are preferably retracted by the maximum amplitude amount of the cantilever or more. In this embodiment, the probe 1 and the sample 8 are retracted by a distance of about ¼ of the maximum stroke of the vertical direction fine-movement mechanism 11. Note that an enough retraction amount may not be obtained depending on the extension amount of the vertical direction fine-movement mechanism 11 at the end of the approach operation with the first excitation condition. Therefore, when the vertical direction fine-movement mechanism 11 is decentered, adjustment is preferably performed at the end of the first excitation condition by coordinately operating the vertical direction fine-movement mechanism 11 and the coarse-movement mechanism 13 so that the vertical direction fine-movement mechanism 11 is substantially centered. After retracting the probe 1 and the sample 8, the frequency characteristic of the cantilever 2 is measured again to set the second excitation condition and a second stop condition.

In this embodiment, the cantilever is excited at a frequency different from the first excitation condition. The excitation frequency is set between the resonance peak and the baseline on the low frequency side of the first-order resonant frequency, which corresponds to the peak in the resonance spectrum of the amplitude of FIG. 3. This operating point is preferably a frequency at an amplitude position of about $1/\sqrt{2}$ of the height from the baseline to the peak. Further, the voltage of the AC signal applied to the vibrator 4 is adjusted to set the amplitude amount of the cantilever 2 during the excitation. The amplitude amount may be the same as or different from the value for the first excitation condition.

Next, the second stop condition is set. In this embodiment, an amplitude amount decreased by about 10% from the amplitude for the second excitation condition is defined as the second stop condition.

In this state, the servo operation of the vertical direction fine-movement mechanism 11 is enabled. Then, the probe 1 and the sample 8 are brought closer to each other by the vertical direction fine-movement mechanism until the amplitude amount of the second stop condition is reached.

In this embodiment, the probe 1 and the sample 8 are brought close to each other once up to the measurable positions with the first excitation condition, and hence only the operation of the vertical direction fine-movement mechanism 11 is enough to complete the approach operation with the second stop condition in most cases. Even if the vertical direction fine-movement mechanism 11 reaches the maximum stroke, the coarse-movement mechanism 13 and the vertical direction fine-movement mechanism 11 are coordinated as in the approach operation with the first excitation condition to allow the probe 1 and the sample 8 to approach each other until the second stop condition is satisfied. For this purpose, if the vertical direction fine-movement mechanism 11 is decentered, the adjustment is preferably performed by coordinating the vertical direction fine-movement mechanism 11 and the coarse-movement mechanism 13 so that the vertical direction fine-movement mechanism 11 is substantially centered.

The operations as described above complete the approach operation between the probe 1 and the sample 8, and a shift is made to a measurement.

Figure 4:
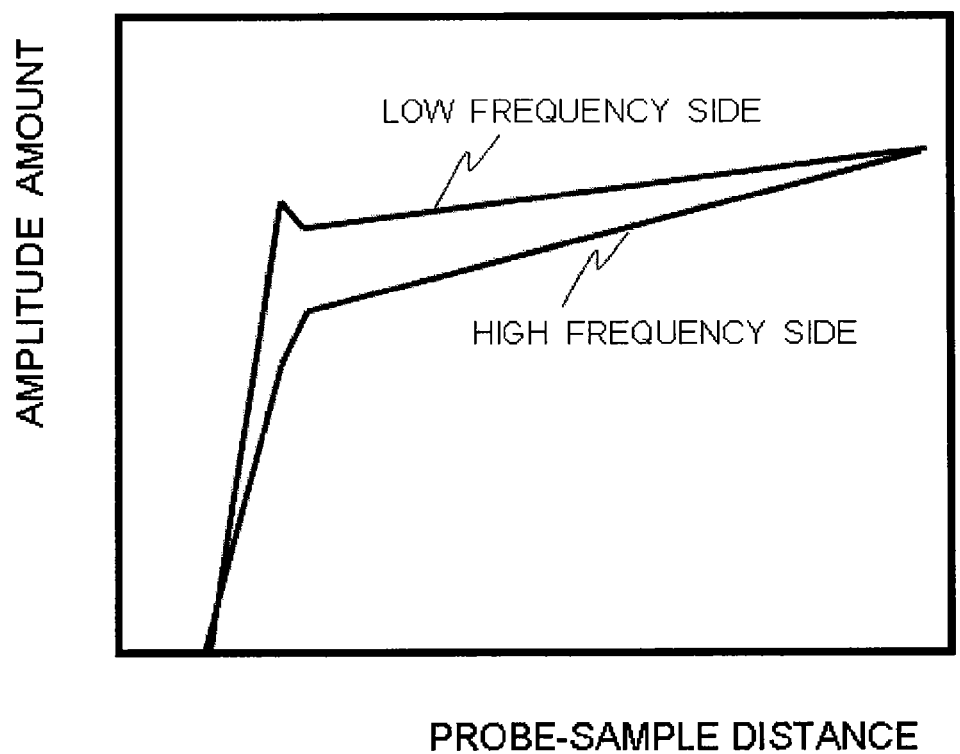
FIG. 4 is a graph illustrating a relationship between probe-sample distance and amplitude amount of the cantilever in a case where excitation is performed on the first-order resonance spectrum of the cantilever.
Figure 5:
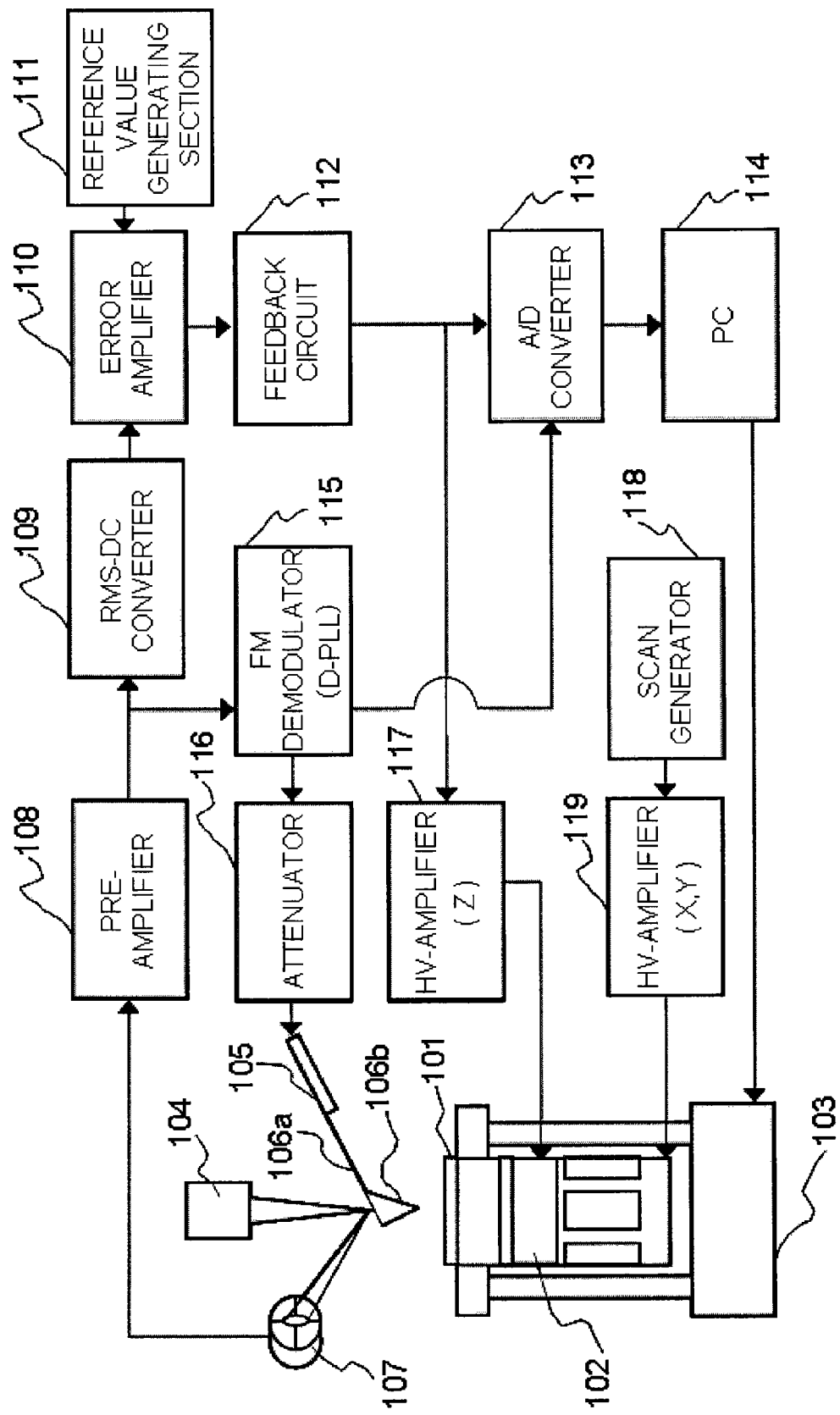
FIG. 5 is a schematic diagram illustrating a conventional scanning probe microscope.
Figure 6:
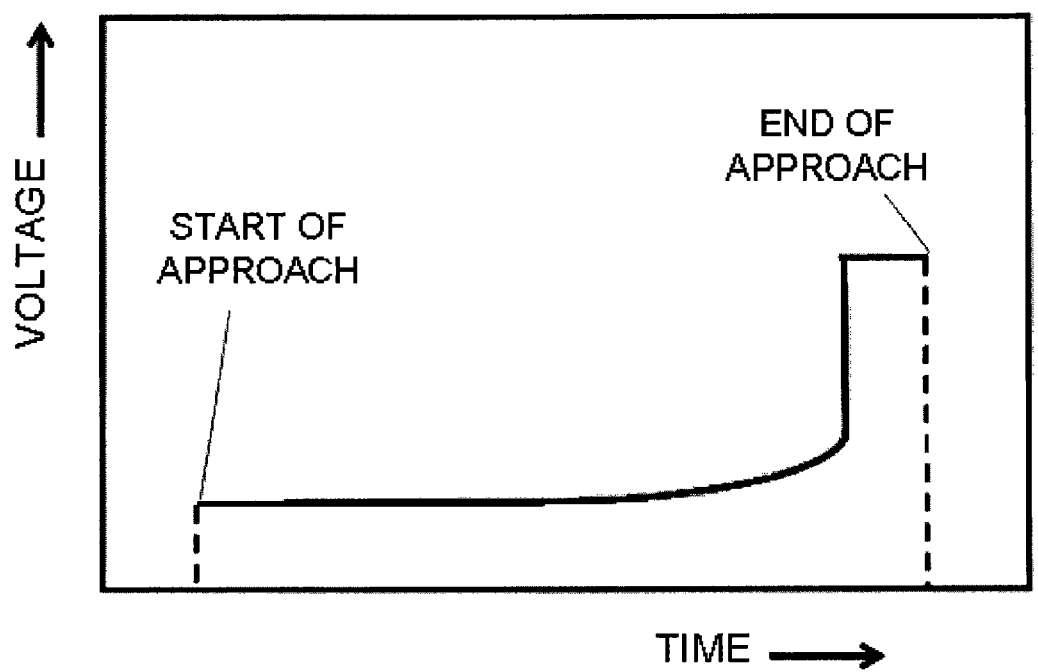
FIG. 6 is a graph illustrating a relationship between time and voltage signal corresponding to an amplitude of a cantilever in a case where a distance between a probe and a sample is decreased in the conventional scanning probe microscope.

FIG. 4 illustrates a relationship between an amplitude amount and a distance between the probe 1 and the sample 8 in the case where the cantilever 2 is excited at the frequency on the high frequency side of the resonance peak of the first-order resonance spectrum and the case where the cantilever 2 is excited at the frequency on the low frequency side thereof. The abscissa represents the distance between the probe 1 and the sample 8, and the distance becomes smaller toward the left. Further, the ordinate represents the amplitude amount, and the amplitude becomes larger toward the top.

As seen from the graph of FIG. 4, in the case of the excitation on the high frequency side, the amplitude starts changing earlier than in the case of the excitation on the low frequency side from when the distance is still large, and the amplitude decreases monotonously as the distance becomes smaller. On the other hand, it may be seen that the oscillation on the low frequency side causes less change in amplitude than the oscillation on the high frequency side until the distance becomes small, and that the amplitude significantly decreases when the distance is small. Therefore, in order to set the first stop condition so that high-speed movement is performed by the coarse-movement mechanism 13 without bringing the probe 1 and the sample 8 into contact with each other, the first stop condition would rather be set on the high frequency side because a larger variation in amplitude occurs from when the distance is still large. In addition, the range of adjustment may be widened and the first stop condition may be set safely and reliably.

On the other hand, when the sample and the probe are close to each other, the slope in the graph of FIG. 4 is steeper on the low frequency side than on the high frequency side. Therefore, when a measurement is performed, the measurement sensitivity is improved by setting on the low frequency side rather than setting on the high frequency side.

By setting the first excitation condition on the high frequency side, bringing the probe and the sample close to each other with the first stop condition while exciting the cantilever 2, then retracting the probe 1 and the sample 8 once by the vertical direction fine-movement mechanism 11, exciting the cantilever 2 with the second excitation condition on the low frequency side to be actually used in the measurement, and allowing the probe 1 and the sample 8 to approach each other with the second stop condition as in this embodiment, the approach operation may be performed at high speed without causing the probe 1 and the sample 8 to collide with each other. Further, when a measurement is performed, the cantilever may be excited with an excitation condition that is optimal for the measurement condition.

The first stop condition and the second stop condition for the series of operations may be set by a person performing the measurement in advance or given as initial values for each cantilever type, and the approach operation is performed automatically after the person performing the measurement commands the apparatus to start the approach operation until the state allowing an automatic measurement is established.

In this embodiment, the first stop condition is performed in two stages, but the approach operation with the first excitation condition may be ended with the first-stage stop condition. In this case, the sample 8 and the probe 1 are separated from each other. Therefore, in setting the second excitation condition, the operation of retracting the probe 1 and the sample 8 by the vertical direction fine-movement mechanism may be omitted. However, this leaves the probability that the probe 1 and the sample 8 may be brought into contact with each other when the amplitude amount of the second excitation condition becomes larger than the distance between the probe 1 and the sample 8. Therefore, the retract operation is preferably always performed for safety even if the probe 1 and the sample 8 are separated from each other. After the completion of the approach operation with the first excitation condition, the vertical direction fine-movement mechanism 11 and the coarse-movement mechanism 13 are coordinated to perform the approach operation between the probe 1 and the sample 8 with the second excitation condition until the second stop condition is satisfied. In the approach method as described above, the movement speed during the approach by coordinating the coarse-movement mechanism 13 and the vertical direction fine-movement mechanism 11 is slower than the movement speed during the approach with only the coarse-movement mechanism 13, and hence the probe 1 and the sample 8 is preferably brought as close to each other as possible within the range that does not cause the collision, by the coarse-movement mechanism 13.

Further, even if the distance between the probe 1 and the sample 8 is too small at the end of the approach operation with the first excitation condition and the approach operation with the second excitation condition, the coarse-movement mechanism 13 and the vertical direction fine-movement mechanism 11 are coordinated to perform an operation of increasing the distance between the probe 1 and the sample 8.

Second Embodiment

Described next is an operation principle of a measurement in a case where a higher-order resonant mode of the cantilever is used for the measurement according to a second embodiment of the present invention. In this embodiment, the same apparatus as in the first embodiment of FIG. 1 is used for the measurement. At this time, the oscillation of the cantilever 2 in the measurement is generated as torsional oscillation around the long axis of the cantilever 2.

The apparatus of FIG. 1 causes the oscillator 17 to generate an arbitrary AC signal of a higher-order resonance spectrum for generating the torsional oscillation of the cantilever 2, and applies the AC signal to the vibrator 4 to oscillate the cantilever 2. In the torsional oscillation, the tip of the probe 1 oscillates substantially parallel to the surface of the sample 8, and the variation in amplitude with respect to the distance between the probe 1 and the sample 8 is smaller than the deflection mode of the cantilever 2. Therefore, the setting of the stop condition is difficult when the approach operation is performed by exciting the cantilever 2 at the frequency on the resonance spectrum of the higher-order torsional mode from the start, and the probe 1 and the sample 8 may collide with each other.

In this embodiment, the approach operation is performed by using the same first excitation condition as the first embodiment, and setting the operating point on the high frequency side of the first-resonance spectrum of the cantilever. The approach operation is the same as the first embodiment, and thus the description thereof is omitted. After the end of the approach operation with the first excitation condition, the probe and the sample are retracted by the vertical direction fine-movement mechanism, the frequency characteristic of the cantilever 2 is measured again, the second excitation condition is set in the vicinity of the resonant frequency of the higher-order resonance spectrum of the oscillation in the torsional mode, and a decreased torsion amount is set as the second stop condition to perform the approach operation between the probe 1 and the sample 8.

By performing the approach operation as described above, even if the measurement is performed in the higher-order oscillating mode such as the torsional mode, the approach operation may be performed at high speed without causing the probe 1 and the sample 8 to collide with each other.

Third Embodiment

Described next is an operation principle of a measurement in a contact mode according to a third embodiment of the present invention.

Apparatus components of this embodiment are the same as those of the first embodiment, and the apparatus of FIG. 1 is used.

When a measurement is performed in the contact mode, it is more difficult to stop the probe 1 and the sample 8 with an appropriate distance therebetween than in the oscillating mode. For example, when the sample 8 and the probe 1 are electrically charged, the cantilever 2 is deflected by an electrostatic force and the approach operation is stopped at a long distance to increase the time required to bring the sample 8 and the probe 1 close to each other up to a measurable area. Further, when the stop condition that may bring the probe 1 and the sample 8 close to each other up to the measurable area is set, it is often the case that the probe 1 and the sample 8 collide with each other. As for an impact upon the collision, the oscillating mode involves intermittent contacts which are small in number and causes a relatively small impact even if the collision does occur because the probe escapes in the oscillation, while the contact mode involves continuous contact and causes a large impact upon the collision, to thereby necessitate a slowdown in speed of the coarse-movement mechanism 13.

Therefore, in this embodiment, the approach operation is first performed in the oscillating mode, then the probe 1 and the sample 8 are retracted by the vertical direction fine-movement mechanism 11, the oscillation of the cantilever 2 is stopped, and the displacement amount of the cantilever 2 is set as the second stop condition to perform the approach operation up to the measurement area. Simply stopping the voltage applied to the vibrator 4 may suffice to stop the oscillation of the cantilever 2, but a mechanism for short-circuiting and connecting electrodes of the piezoelectric element 4 to the ground potential is provided to stop the oscillation of the vibrator 4 more reliably. By performing the approach operation as described above, the first excitation condition is set even when the measurement is performed in the contact mode, and hence the approach operation may be performed at high speed without causing the probe 1 and the sample 8 to collide with each other.

Even if the sample and the probe collide with each other in the approach operation with the first excitation condition, the impact on the probe and the sample is smaller and hence the damage is reduced compared to the contact mode. Further, the oscillating mode is less susceptible to static electricity compared to the contact mode. Therefore, even when the static electricity is generated, the approach operation is performed in the oscillating mode until the first stop condition is satisfied, and accordingly the distance between the sample and the probe may be reduced further into the proximity with the first excitation condition. As a result, the approach operation may be performed at high speed.

Fourth Embodiment

Figure 7:
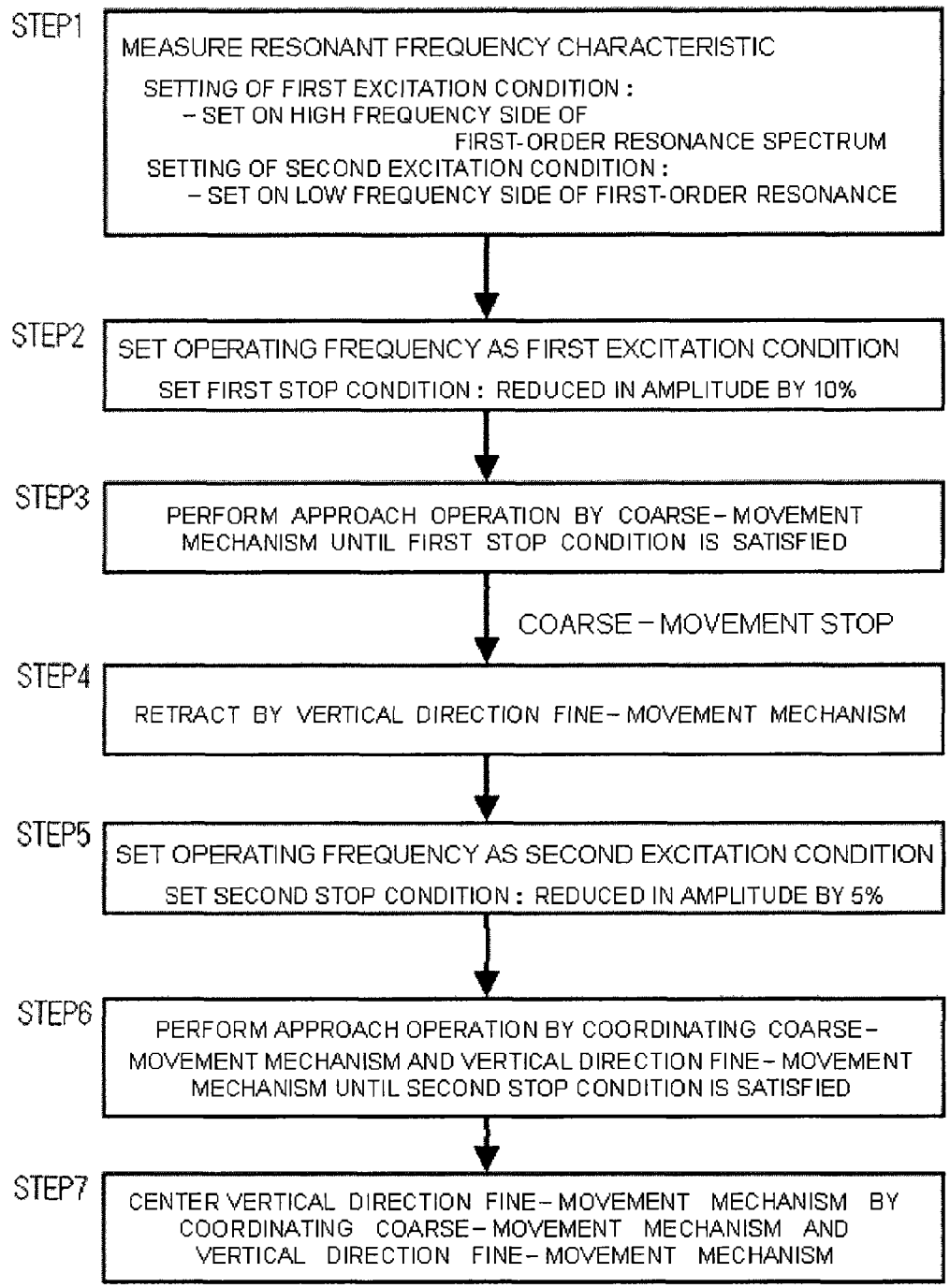
FIG. 7 is a flow chart of an approach method for a probe and a sample according to a fourth embodiment of the present invention.
Figure 8:
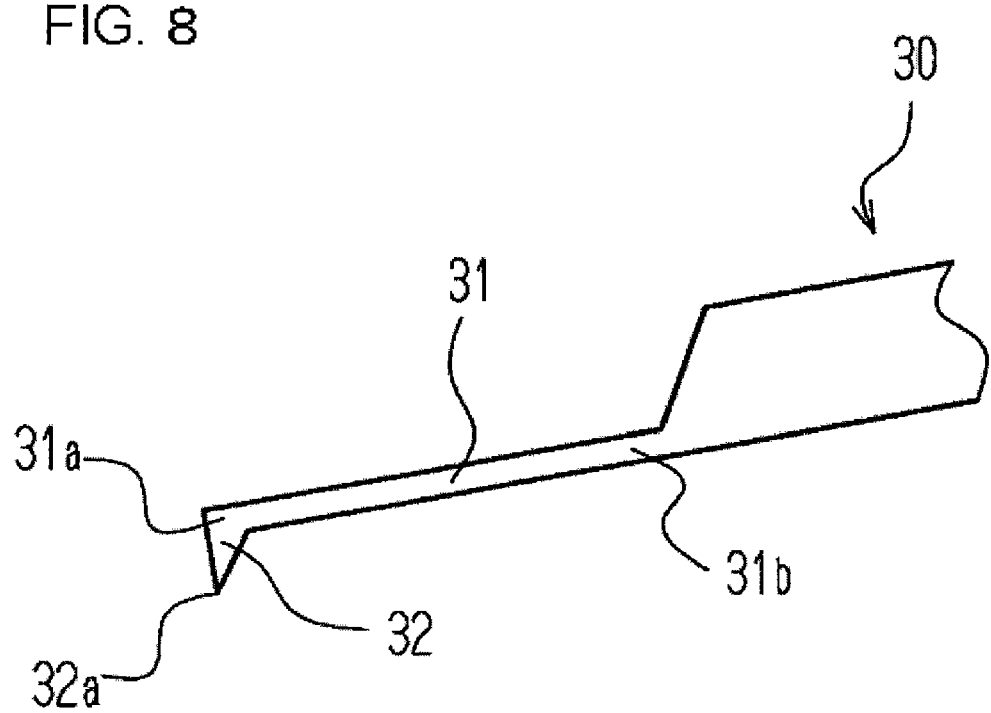
FIG. 8 is a side view of a cantilever used in the fourth embodiment of the present invention.

FIG. 7 is a flow chart of an approach method for a probe and a sample in a scanning probe microscope according to a fourth embodiment of the present invention, and FIG. 8 is a side view of a cantilever used in the fourth embodiment. This embodiment is directed to the scanning probe microscope operated in the oscillating mode. Apparatus components of this embodiment are the same as those of FIG. 1, the apparatus components other than the cantilever are given the reference numerals in FIG. 1, and the detailed description of overlapping parts is omitted.

Figure 9:
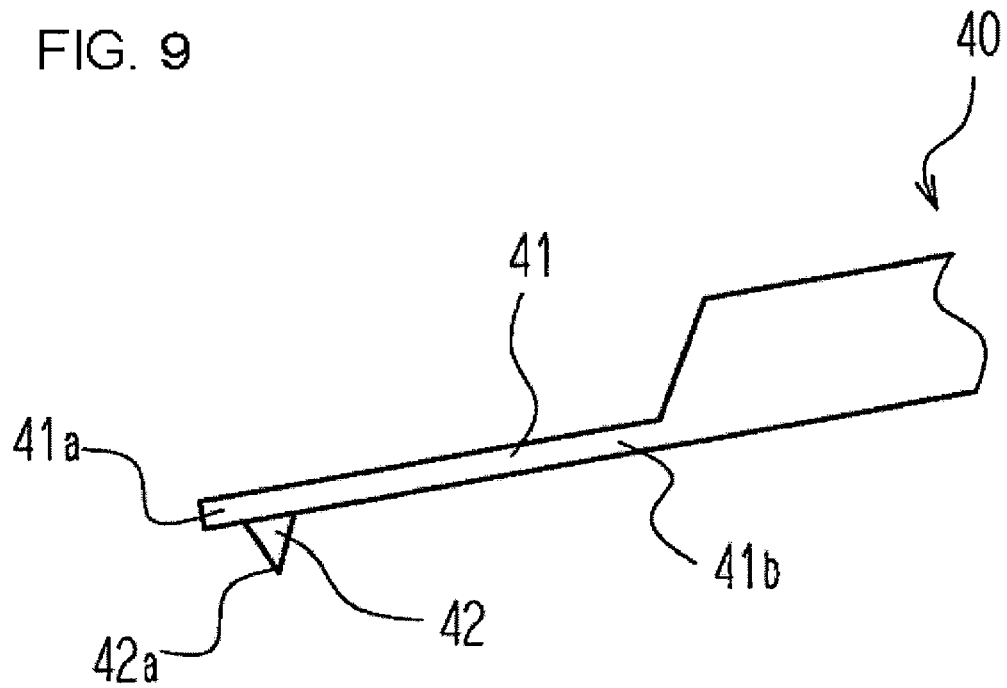
FIG. 9 is a side view of a cantilever that has been conventionally used in a scanning probe microscope.

A probe 42 of a conventional cantilever 40 used in the scanning probe microscope is provided slightly on the proximal side of a distal end 41a of a cantilever portion 41 as illustrated in FIG. 9, and a probe tip 42a has been impossible to observe when observed from a back surface of the cantilever portion 41 because the field of view is blocked by a portion of the distal end 41a of the cantilever. Recently, a cantilever 30 including a probe 32 at a cantilever distal end 31a as illustrated in FIG. 8 has been put to use, and hence a probe tip 32a may be positioned accurately at a point to be observed by simultaneously observing the probe tip 32a and the sample by the optical microscope 14 without being blocked by the cantilever distal end 31a. The cantilever of FIG. 8 is made of silicon and has length, width, and thickness dimensions of 120 μm, 30 μm, and 5 μm, respectively, and the height of the probe is 10 μm.

In the scanning probe microscope, for the purposes of preventing a proximal end 31b, 41b of the cantilever from contacting the sample 8 and reflecting a laser beam 6 from an optical lever optical system 5 used for detecting displacement of the cantilever portion 31, 41 toward the detector 7, the cantilever 30, 40 is placed so that a long axis of the cantilever is inclined approximately 5° to 15° with respect to the sample surface. Therefore, when the probe 32, 42 and the sample 8 are allowed to approach each other, the side of the distal end 31a, 41a of the cantilever is brought closer to the sample 8 ahead of the proximal end 31b, 41b of the cantilever.

When the cantilever portion 31, 41 is positioned to be inclined, the amplitude of the cantilever portion 41 is significantly damped in the conventional cantilever 40 of FIG. 9 due to air existing in a region between the sample surface 8 and the cantilever portion 41a on the distal side of the portion at which the probe 42 is provided. On the other hand, the damping due to air is reduced in the cantilever 30 of FIG. 8 compared to the conventional cantilever 40, because the cantilever portion 31 includes no component on the distal side of the portion at which the probe 32 is provided.

When the cantilever 30, in which the damping due to air is reduced as in FIG. 8, is used to allow the probe 32 and the sample 8 to approach each other, no change in amplitude, phase, and frequency of the cantilever portion 31 occurs unless the cantilever 30 is allowed to approach the sample 8 further into the proximity than the conventional cantilever 40 as in FIG. 9. Even after entering the measurement area, parameters of amounts of change in amplitude, phase, and frequency, which are set as reference values in controlling the distance between the probe 32 and the sample 8, are very small values. Therefore, in order to stop the approach operation in time before the probe 32 and the sample 8 collide with each other, the values of the amounts of change, which are set for stopping the approach operation, need to be set very small. When the amounts of change are set to small values, it has been very difficult to adjust the parameters because the parameters may exceed the stop condition due to disturbance oscillation or the like during the approach operation to stop the approach operation too early, or the probe 32 and the sample 8 may be brought so close as to collide with each other with the set stop condition due to fluctuations among cantilevers.

Therefore, in this embodiment, as in the first embodiment, the probe 32 and the sample 8 are allowed to approach each other while exciting the cantilever at a frequency on the high frequency side of the resonant frequency on the first-order resonance spectrum as a first excitation condition, and then the probe 32 and the sample 8 are allowed to further approach each other while exciting the cantilever portion 31 at a frequency on the low frequency side of the resonant frequency on the first-order resonance spectrum as a second excitation condition to perform the measurement in the second excitation condition.

Next, the approach operation is described referring to the flow chart of FIG. 7.

STEP 1: A resonant frequency characteristic of the cantilever portion 31 is measured, a frequency and an amplitude of the first excitation condition are set on the high frequency side of the resonant frequency on the first-order resonance spectrum, and a frequency and an amplitude of the second excitation condition are set on the low frequency side thereof.

The values may be set as appropriate. As a guide for the set values, when an amplitude at a resonance peak is set to A in a cantilever having a resonant frequency f0, operating frequencies are preferably set to frequencies having an amplitude of $A/\sqrt{2}$ on the high frequency side and the low frequency side of the resonance peak on a resonance spectrum. In this case, when the operating frequency on the low frequency side is f1 and the operating frequency on the high frequency side is f2, a mechanical Q value which is determined by a damping property of the cantilever and indicates the sharpness of the peak of the resonance spectrum is expressed as $Q=f0/(f2-f1)$. From this expression, the operating point on the low frequency side and the operating point on the high frequency side may be set by setting the amplitude at the resonant frequency and measuring the Q value from the oscillation spectrum.

In this embodiment, the first-order resonant frequency, which is determined by the shape and the material characteristics of the cantilever, is 500 kHz, and the mechanical Q value is 400. Further, the amplitude amount at the resonance peak is set to 20 nm.

In this case, the first excitation condition is set 625 Hz higher in frequency than the peak at 500 kHz (to 500.625 kHz), and the amplitude amount is correspondingly set to 14 nm. The second excitation condition is set 625 Hz lower in frequency than the peak at 500 kHz (to 499.375 kHz), and the amplitude amount is correspondingly set to 14 nm.

STEP 2: The point reduced in amplitude by 10% from the amplitude amount set as the first stop condition in STEP 1 is set.

Specifically, the point reduced in amplitude by 1.4 nm from the first amplitude amount of 14 nm (amplitude amount of 12.6 nm) is set as the first stop condition.

STEP 3: The probe 32 and the sample 8 are allowed to approach each other with the first excitation condition by the coarse-movement mechanism 13 until the stop condition in STEP 2 is satisfied. At this time, the probe 32 and the sample 8 approach each other up to several tens of μm.

STEP 4: The probe 32 and the sample 8 are retracted by several hundreds of nm to several μm by the vertical direction fine-movement mechanism 11.

STEP 5: The operation point is set as the second excitation condition on the low frequency side set in STEP 1, and the second stop condition is set. The second stop condition is set to a position decreased in amplitude by 5% from the amplitude amount in the second excitation condition recognized in STEP 1.

Specifically, the point reduced in amplitude by 0.7 nm from the amplitude amount of 14 nm (amplitude amount of 13.3 nm) is set as the second stop condition.

Note that the probe 32 and the sample 8 are retracted in STEP 4 for the purpose of preventing possible collision between the probe and the sample when the excitation condition is changed in STEP 5.

STEP 6: The vertical direction fine-movement mechanism 11 and the coarse-movement mechanism 13 are coordinated to allow the probe 32 and the sample 8 to approach each other until the second stop condition is satisfied.

STEP 7: When the vertical direction fine-movement mechanism 11 is significantly decentered, the vertical direction fine-movement mechanism 11 and the coarse-movement mechanism 13 are coordinated to center the vertical direction fine-movement mechanism 11.

The coordinated operations in STEP 6 and STEP 7 are the same as those described in the first embodiment, and hence the detailed description thereof is omitted.

In this case, the probe 32 and the sample 8 do not collide with each other with the first excitation condition (on the high frequency side) even if the amplitude is damped by 10% from the initial amplitude amount. On the other hand, the probe 32 and the sample 8 enter the measurement area in which the probe 32 and the sample 8 intermittently contact each other with the second excitation condition (on the low frequency side) at the position damped by 5% from the initial amplitude amount. If the first excitation condition is set on the low frequency side, the stop condition for stopping the probe 32 at a position at which the probe 32 does not collide with the sample 8 should be set to a value smaller than 5%. Therefore, the setting range is reduced to make parameter adjustment extremely difficult.

The setting range of the set value of the amount of decrease in amplitude of the first stop condition is increased by setting the first excitation condition and the second excitation condition on the high frequency side and the low frequency side, respectively, so that the first stop condition becomes larger than the second stop condition. In addition, the set value of the amount of decrease in amplitude may be set larger in the first stop condition than in the second stop condition, to thereby prevent the parameter from exceeding the stop condition due to the fluctuation of the stop condition parameter caused by the disturbance oscillation during the approach operation or the like to stop the approach operation too early, or the probe 32 and the sample 8 from being brought so close as to collide with each other due to the fluctuations among the cantilevers.

Further, the measurement sensitivity is higher when the second excitation condition is set on the low frequency side to perform the measurement with the second excitation condition, than when the measurement is performed on the high frequency side.

Note that the second stop condition may be increased gradually. Specifically, the operations of setting, in STEP 5, the second stop condition to a value smaller than the damped amplitude amount for entering the measurement area, for example, 2%, coordinating, in STEP 6, the vertical direction fine-movement mechanism 11 and the coarse-movement mechanism 13 to allow the probe 32 and the sample 8 to approach each other until the amplitude is damped by 2%, which is the originally set second stop condition, then increasing the stop condition to about 3%, for example, and coordinating the vertical direction fine-movement mechanism 11 and the coarse-movement mechanism 13 again to allow the probe 32 and the sample 8 to approach each other are repeatedly performed until the probe and the sample enter the measurement area. By thus increasing the second stop condition gradually, the probe and the sample may be brought close to each other so that the measurement may be performed with a smaller force within a range that does not deviate from the measurement area, and the probe and the sample are prevented from wearing during the approach operation and the scanning.

Fifth Embodiment

FIG. 10 is a flow chart of an approach operation in a fifth embodiment of the present invention. In this embodiment, the apparatus is operated in the oscillating mode to perform the approach operation, and in the contact mode to perform the measurement. Basic operations of this embodiment are the same as those of the third embodiment except for the method of setting the first excitation condition. Therefore, the same reference numerals as used in FIG. 1 are given to apparatus components of this embodiment, and the description of overlapping parts is omitted.

The cantilever 2 used in this embodiment is made of silicon nitride, and is 120 µm long, 15 µm wide, and 400 nm thick. The cantilever 2 is soft with a stiffness of about 0.02 N/m. Accordingly, the cantilever 2 has a low transmission efficiency of the excitation of the piezoelectric element 4 for exciting the cantilever, and hence the amplitude is small when excited in the first-order oscillating mode. As a result, the amplitude becomes unstable due to an overlap between the oscillation spectrum of components other than the cantilever portion and the resonance spectrum of the cantilever 2, and a high noise ratio in the oscillation signal itself of the cantilever. Therefore, in this embodiment, the first excitation frequency is set as the first excitation condition on a resonance spectrum peaked at 193 kHz, which is the second-order resonant frequency, by applying a voltage on the piezoelectric element for excitation to excite the cantilever, to obtain an amplitude about 40 times greater than the resonance spectrum peaked at 31 kHz, which is the first-order resonant frequency, at the same applied voltage.

Next, the approach operation is described referring to the flow chart of FIG. 10.

STEP 1: The operating point is set as the first excitation condition on the low frequency side of the resonant frequency on the second-order resonance spectrum. In this embodiment, the second-order resonant frequency is 193 kHz, and the amplitude amount at the resonant frequency is 20 nm. The mechanical Q value is 150. Based on these conditions, the operating point is set 643 Hz lower in frequency than the resonant frequency (to 192.357 kHz), and the amplitude amount is set to 14 nm.

STEP 2: The first-stage stop condition in the first stop condition is set to a point decreased in amplitude by 10%. Specifically, the first-stage stop condition in the first stop condition is set to a point decreased in amplitude by 1.4 nm from the first amplitude amount 14 nm (amplitude amount of 12.6 nm).

STEP 3: The probe 1 and the sample 8 are allowed to approach each other by the coarse-movement mechanism 13 to stop at a position about several tens of µm away from each other with the first-stage stop condition in the first stop condition.

STEP 4: The second-stage stop condition in the first stop condition is set to a point decreased by 20% from the initial amplitude amount. Specifically, the second-stage stop condition in the first stop condition is set to a point decreased in amplitude by 2.8 nm from the first amplitude amount 14 nm (amplitude amount of 11.2 nm).

STEP 5: The coarse-movement mechanism 13 and the vertical direction fine-movement mechanism 11 are operated coordinately to allow the probe 1 and the sample 8 to approach each other until the second-stage stop condition in the first stop condition is satisfied. At this time, the probe 1 and the sample 8 are brought close to each other up to the measurement area in which the probe 1 and the sample 8 intermittently contact each other.

STEP 6: The probe 1 and the sample 8 are retracted by the vertical direction fine-movement mechanism 11.

STEP 7: The oscillation of the cantilever 2 is stopped.

STEP 8: The displacement amount of the cantilever 2 is set as the second stop condition to 10 nm from the position before the start of the approach operation.

STEP 9: The approach operation is performed by the vertical direction fine-movement mechanism 11 until the second stop condition is satisfied, to thereby bring the probe and the sample close to each other up to the measurement area.

STEP 10: If the vertical direction fine-movement mechanism 11 is significantly decentered, the vertical direction fine-movement mechanism 11 and the coarse-movement mechanism 13 are operated coordinately to center the vertical direction fine-movement mechanism 11.

If the amplitude amount is small as with the soft cantilever used in the contact mode, setting the first excitation condition not on the first-order resonance spectrum but on the second-order resonance spectrum on which a large amplitude amount may be obtained allows the probe 1 and the sample 8 to approach in the oscillating mode reliably without being affected by the disturbance, and then the measurement to be performed in the contact mode. As a result, the approach operation may be performed at high speed without causing the probe 1 and the sample 8 to collide with each other.

Note that in this embodiment, the first operating point is set on the second-order resonance spectrum because the amplitude at the second-order resonance spectrum is large, but this difference in amplitude amount occurs because of various factors such as the piezoelectric element for excitement and the fixing method for the cantilever in addition to the oscillation transfer efficiency of the cantilever itself. Therefore, when the amplitude is larger in a higher-order oscillating mode, the first operating point may be set on the higher-order resonance spectrum.

Further, the operating point of the first excitation condition may be set not only on the low frequency side, but on the high frequency side or on the resonant frequency in STEP 1.

Further, the displacement amount of the second stop condition may be set in steps in STEP 8. For example, the second stop condition may be set to 5 nm at first to perform the approach operation by the vertical direction fine-movement mechanism 11, and the stop condition is increased in steps of 1 nm when the probe and the sample are separated from each other up to 10 nm until the probe and the sample finally reach the measurement area. By thus increasing the second stop condition in steps, the probe and the sample may be brought closer to each other so that the measurement may be performed with a smaller force within a range that does not deviate from the measurement area, and the probe and the sample are prevented from wearing during the approach operation and the scanning.

The present invention has been described with reference to the embodiments, but the present invention is not limited thereto. The first excitation condition, the first stop condition, the second excitation condition, and the second stop condition are not limited to those in the embodiments, and any condition may be set as long as the first excitation condition and the second excitation condition are different from each other.

Further, in setting the stop condition, not only the amplitude and the displacement of the cantilever but also a phase difference and a frequency change may be measured. The first stop condition and the second stop condition may be set for different targets.

The configuration and operation during the approach operation of the coarse-movement mechanism and the vertical direction fine-movement mechanism in the embodiments are merely provided as examples, and any method may be applied.

Further, any measurement environment such as in the atmosphere, in a vacuum, or in a solution may be applied.

Especially in the vacuum, the damping of the cantilever due to air is reduced, and the amplitude of the cantilever does not vary until the probe and the sample approach each other up to a very small distance from each other. Therefore, the first excitation condition is effectively set on the high frequency side of the resonant frequency on the first-order resonance spectrum.

Further, the amounts of decrease in amplitude and displacement are set as the stop condition in the above-mentioned embodiments, but amounts of increase in amplitude and displacement may be set as the stop condition because there is an area in which the amplitude and displacement increase when the probe and the sample are allowed to approach each other in time before the probe and the sample are brought into contact with each other.

Further, after the setting with the second stop condition, the measurement condition such as the amplitude, displacement, phase difference, and the frequency may be reset to a condition that is optimal for the measurement.

When the operations from the start of the measurement to the completion of the approach operation are performed automatically, all of the oscillation condition and the stop condition may be set at the start, or may be set separately in the course of the operations.

Further, the conditions including the optimal measurement condition may be set automatically.

Further, the configuration of the scanning probe microscope is not limited to those in the embodiments, and the three-axis fine-movement mechanism and the coarse-movement mechanism may be provided on the cantilever side, for example, to scan the cantilever. Further, a mode of the displacement detecting mechanism in which a resistor is included in the cantilever for detection or the like is also encompassed in the present invention. The excitation mechanism may employ not only the excitation by the piezoelectric element, but also a mode in which the cantilever is excited with a magnetic force, electromagnetic force, light energy, thermal oscillation, or the like.

Further, the present invention is not limited to the atomic force microscope for measuring the irregularities on the sample, but may be applied to various scanning probe microscopes for measuring an electrical characteristic, magnetic characteristic, optical characteristic, mechanical characteristic, and the like.

What is claimed is:

1. An approach method for a probe and a sample in a scanning probe microscope,
   the scanning probe microscope comprising:
   a cantilever including the probe at a distal end thereof;
   an excitation mechanism for exciting the cantilever;
   a displacement detecting mechanism for detecting a displacement of the cantilever;
   a vertical direction fine-movement mechanism for adjusting a distance between the probe and the sample placed at a position opposing the probe; and
   a coarse-movement mechanism for allowing the probe and the sample to approach each other,
   the approach method comprising, in detecting the displacement of the cantilever by the displacement detecting mechanism and allowing the probe and the sample to approach each other by at least one of the coarse-movement mechanism and the vertical direction fine-movement mechanism at the same time:
   exciting the cantilever by the excitation mechanism with a first excitation condition and allowing the probe and the sample to approach each other with a first stop condition; and
   exciting, after an approach operation with the first stop condition, the cantilever with a second excitation condition that is different from the first excitation condition, setting a second stop condition, and allowing the probe and the sample to approach each other by the at least one of the vertical direction fine-movement mechanism and the coarse-movement mechanism until the second stop condition is satisfied.

2. An approach method for a probe and a sample in a scanning probe microscope according to claim 1, wherein:
   the first excitation condition for the cantilever is excitation at a frequency on a high frequency side of a first-order resonant frequency in a first-order resonance spectrum of the cantilever; and
   any one of an amplitude, a phase, and a resonant frequency of the cantilever detected by the displacement detecting mechanism is set as the first stop condition.

3. An approach method for a probe and a sample in a scanning probe microscope according to claim 1, wherein:
   the second excitation condition for the cantilever is excitation at a frequency on a low frequency side of a first-order resonant frequency in a first-order resonance spectrum of the cantilever; and
   any one of an amplitude, a phase, and a resonant frequency of the cantilever detected by the displacement detecting mechanism is set as the second stop condition.

4. An approach method for a probe and a sample in a scanning probe microscope according to claim 1, wherein the second excitation condition is excitation at a frequency on a second- or higher-order resonance spectrum of the cantilever.

5. An approach method for a probe and a sample in a scanning probe microscope according to claim 1, wherein:
   the scanning probe microscope further comprises:
   at least one excitation condition setting means;
   a first stop condition setting means; and
   a second stop condition setting means; and
   the approach method further comprises, in performing approach operations from a start of the approach operation for the probe and the sample to satisfaction of the second stop condition, setting at least one condition set by each of the at least one excitation condition setting means, the first stop condition setting means, and the second stop condition setting means at once or separately in a plurality of times to allow the probe and the sample to approach each other.

6. An approach method for a probe and a sample in a scanning probe microscope,
   the scanning probe microscope comprising:
   a cantilever including the probe at a distal end thereof;
   an excitation mechanism for exciting the cantilever;
   a displacement detecting mechanism for detecting a displacement of the cantilever;
   a vertical direction fine-movement mechanism for adjusting a distance between the probe and the sample placed at a position opposing the probe; and
   a coarse-movement mechanism for allowing the probe and the sample to approach each other,
   the approach method comprising, in detecting the displacement of the cantilever by the displacement detecting mechanism and allowing the probe and the sample to approach each other by at least one of the coarse-movement mechanism and the vertical direction fine-movement mechanism at the same time:
   exciting the cantilever by the excitation mechanism with a first excitation condition and allowing the probe and the sample to approach each other with a first stop condition; and
   stopping, after an approach operation with the first stop condition, exciting the cantilever, setting a deflection amount of the cantilever detected by the displacement detecting mechanism as a second stop condition, and allowing the probe and the sample to approach each other by the at least one of the vertical direction fine-movement mechanism and the coarse-movement mechanism until the second stop condition is satisfied.

7. An approach method for a probe and a sample in a scanning probe microscope according to claim 6, wherein:
the scanning probe microscope further comprises:
at least one excitation condition setting means;
a first stop condition setting means; and
a second stop condition setting means; and
the approach method further comprises, in performing approach operations from a start of the approach operation for the probe and the sample to satisfaction of the second stop condition, setting at least one condition set by each of the at least one excitation condition setting means, the first stop condition setting means, and the second stop condition setting means at once or separately in a plurality of times to allow the probe and the sample to approach each other.

* * * * *